(12) United States Patent  
Kerr et al.

(10) Patent No.: US 9,406,079 B1
(45) Date of Patent: Aug. 2, 2016

(54) CONTENT RELEVANCE WEIGHTING SYSTEM

(75) Inventors: Michael A. Kerr, Reno, NV (US); David Stewart, Stateline, NV (US)

(73) Assignee: NEXRF CORPORATION, Reno, NV (US)

( * ) Notice: Subject to any disclaimer, the term of this patent is extended or adjusted under 35 U.S.C. 154(b) by 118 days.

(21) Appl. No.: 13/251,745

(22) Filed: Oct. 3, 2011

Related U.S. Application Data

(63) Continuation-in-part of application No. 13/218,256, filed on Aug. 25, 2011, and a continuation-in-part of application No. 13/153,214, filed on Jun. 3, 2011, and a continuation-in-part of application No. 13/153,238, filed on Jun. 3, 2011, and a continuation-in-part of application No. 13/153,248, filed on Jun. 3, 2011, and (Continued)

(51) Int. Cl.
*G06Q 30/00* (2012.01)
*G06Q 30/02* (2012.01)

(52) U.S. Cl.
CPC .................................. *G06Q 30/0254* (2013.01)

(58) Field of Classification Search
CPC ................................................. G06Q 30/0254
USPC ........................................................ 705/14.52
See application file for complete search history.

(56) References Cited

U.S. PATENT DOCUMENTS

| | | | |
|---|---|---|---|
| 4,339,798 A | 7/1982 | Hedges et al. | |
| 4,856,787 A | 8/1989 | Itkis | |
| 5,586,937 A | 12/1996 | Menashe | |
| 5,594,491 A | 1/1997 | Hodge et al. | |
| 5,630,757 A | 5/1997 | Gagin et al. | |
| 5,643,086 A | 7/1997 | Alcorn et al. | |
| 5,738,583 A | 4/1998 | Comas et al. | |
| 5,761,416 A | 6/1998 | Mandal et al. | |
| 5,761,647 A | 6/1998 | Boushy | |
| 5,762,552 A | 6/1998 | Vuong et al. | |
| 5,768,382 A | 6/1998 | Schneier et al. | |
| 5,779,545 A | 7/1998 | Berg et al. | |
| 5,800,268 A | 9/1998 | Molnick | |
| 5,851,149 A | 12/1998 | Xidos et al. | |

(Continued)

FOREIGN PATENT DOCUMENTS

| | | | | |
|---|---|---|---|---|
| FI | WO2008065257 A1 | | 6/2008 | |
| JP | 2009025019 A | * | 2/2009 | ............. G01C 21/00 |
| WO | 2008065257 A1 | | 6/2008 | |

OTHER PUBLICATIONS

Wirelss Network. Wikipedia. http://en.wikipedia.org/wiki/Wireless_network. Nov. 17, 2008.

(Continued)

*Primary Examiner* — James A Reagan
(74) *Attorney, Agent, or Firm* — Michael A. Kerr; Kerr IP Group, LLC

(57) ABSTRACT

A system for adjusting a relevance weight value for a content item is described. The system comprises a content delivery module configured to deliver a plurality of content items to a device via a network. The content items are displayed on the device. A content storage module is configured to store a relevance weight value and a location in association with each content item. A location detection module is configured to determine a location of the wireless device. A user provides a feedback input for a content item. The relevance weight value associated with the location and the content item is adjusted according to the feedback input provided.

21 Claims, 12 Drawing Sheets

Related U.S. Application Data a continuation-in-part of application No. 12/821,852, filed on Jun. 23, 2010, now Pat. No. 8,738,024, and a continuation-in-part of application No. 12/413,547, filed on Mar. 28, 2009, now Pat. No. 8,942,995, and a continuation-in-part of application No. 11/948,007, filed on Nov. 30, 2007.

(60) Provisional application No. 61/482,834, filed on May 5, 2011, provisional application No. 61/427,753, filed on Dec. 28, 2010, provisional application No. 61/427,755, filed on Dec. 28, 2010, provisional application No. 61/454,664, filed on Mar. 21, 2011, provisional application No. 61/472,054, filed on Apr. 5, 2011, provisional application No. 61/376,936, filed on Aug. 25, 2010, provisional application No. 61/351,677, filed on Jun. 4, 2010, provisional application No. 61/351,770, filed on Jun. 4, 2010, provisional application No. 61/352,242, filed on Jun. 7, 2010, provisional application No. 61/223,565, filed on Jul. 7, 2009, provisional application No. 61/040,661, filed on Mar. 29, 2008, provisional application No. 60/872,351, filed on Nov. 30, 2006.

(56) References Cited

U.S. PATENT DOCUMENTS

| | | | |
|---|---|---|---|
| 5,871,398 A | 2/1999 | Schneier et al. |
| 5,902,983 A | 5/1999 | Crevelt et al. |
| 5,947,821 A | 9/1999 | Stone |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 * | 10/2003 | Golding ............ G06F 17/30867 |
| 6,676,522 B2 | 1/2004 | Rowe |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Rasanen et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,492,995 B2 | 7/2013 | Maxik et al. |
| 8,506,406 B2 | 8/2013 | Kerr |
| 8,506,407 B2 | 8/2013 | Kerr |
| 8,523,679 B2 | 9/2013 | Kerr |
| 8,738,024 B1 | 5/2014 | Kerr et al. |
| 8,747,229 B2 | 6/2014 | Kerr |
| 8,942,995 B1 | 1/2015 | Kerr |
| 9,043,222 B1 | 5/2015 | Kerr et al. |
| 2001/0004768 A1 | 6/2001 | Hodge et al. |
| 2001/0005908 A1 | 6/2001 | Hodge et al. |
| 2001/0036224 A1 | 11/2001 | Demello et al. |
| 2001/0039210 A1 | 11/2001 | ST-Denis |
| 2001/0044337 A1 | 11/2001 | Rowe et al. |
| 2002/0002073 A1 | 1/2002 | Montgomery et al. |
| 2002/0007494 A1 | 1/2002 | Hodge |
| 2002/0056125 A1 | 5/2002 | Hodge et al. |
| 2002/0056143 A1 | 5/2002 | Hodge et al. |
| 2002/0069105 A1 | 6/2002 | Do Rosario Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 | 12/2002 | Ryan |
| 2003/0009385 A1 | 1/2003 | Tucciarone et al. |
| 2003/0030666 A1 * | 2/2003 | Najmi ............... G06F 3/0482 |
| | | 715/745 |
| 2003/0032409 A1 | 2/2003 | Hutcheson et al. |
| 2003/0064805 A1 | 4/2003 | Wells |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0085257 A1 * | 4/2005 | Laird .................. A61B 5/04 |
| | | 455/550.1 |
| 2005/0114212 A1 | 5/2005 | Carrez et al. |
| 2005/0136949 A1 | 6/2005 | Barnes |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0246334 A1 | 11/2005 | Tao et al. |
| 2005/0261063 A1 | 11/2005 | Boyd et al. |
| 2006/0003830 A1 | 1/2006 | Walker et al. |
| 2006/0004627 A1 | 1/2006 | Baluja |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |
| 2006/0238382 A1 | 10/2006 | Kimchi et al. |
| 2006/0240891 A1 | 10/2006 | Klinkhammer et al. |

(56) References Cited

U.S. PATENT DOCUMENTS

| | | | |
|---|---|---|---|
| 2006/0287810 A1 | 12/2006 | Sadri et al. | |
| 2007/0024580 A1 | 2/2007 | Sands et al. | |
| 2007/0025265 A1 | 2/2007 | Porras et al. | |
| 2007/0060306 A1 | 3/2007 | Amaitis et al. | |
| 2007/0061229 A1 | 3/2007 | Ramer et al. | |
| 2007/0087834 A1 | 4/2007 | Moser et al. | |
| 2007/0100963 A1 | 5/2007 | Ban et al. | |
| 2007/0136132 A1 | 6/2007 | Weiser et al. | |
| 2007/0149215 A1 | 6/2007 | Misikangas | |
| 2007/0149216 A1 | 6/2007 | Misikangas | |
| 2007/0167210 A1 | 7/2007 | Kelly et al. | |
| 2007/0168127 A1 | 7/2007 | Zaruba et al. | |
| 2007/0184852 A1 | 8/2007 | Johnson et al. | |
| 2007/0218975 A1 | 9/2007 | Iddings et al. | |
| 2007/0243925 A1 | 10/2007 | LeMay et al. | |
| 2007/0244633 A1 | 10/2007 | Phillips et al. | |
| 2007/0257831 A1 | 11/2007 | Mathews et al. | |
| 2007/0270212 A1 | 11/2007 | Cockerille et al. | |
| 2007/0281692 A1 | 12/2007 | Bucher et al. | |
| 2008/0026844 A1 | 1/2008 | Wells | |
| 2008/0032705 A1 | 2/2008 | Patel et al. | |
| 2008/0039192 A1 | 2/2008 | Laut | |
| 2008/0057894 A1 | 3/2008 | Aleksic et al. | |
| 2008/0076572 A1 | 3/2008 | Nguyen et al. | |
| 2008/0085692 A1 | 4/2008 | Hart et al. | |
| 2008/0096659 A1 | 4/2008 | Kreloff et al. | |
| 2008/0097858 A1 | 4/2008 | Vucina et al. | |
| 2008/0102947 A1 | 5/2008 | Hays et al. | |
| 2008/0108430 A1 | 5/2008 | Evans | |
| 2008/0113785 A1 | 5/2008 | Alderucci et al. | |
| 2008/0153515 A1 | 6/2008 | Mock et al. | |
| 2008/0162037 A1 | 7/2008 | Hasan Mahmoud | |
| 2008/0166973 A1 | 7/2008 | Hart et al. | |
| 2008/0167106 A1 | 7/2008 | Lutnick et al. | |
| 2008/0186234 A1 | 8/2008 | Alles et al. | |
| 2008/0189360 A1 | 8/2008 | Kiley et al. | |
| 2008/0207296 A1 | 8/2008 | Lutnick et al. | |
| 2008/0227473 A1 | 9/2008 | Haney | |
| 2008/0249833 A1 | 10/2008 | Ali et al. | |
| 2008/0252527 A1* | 10/2008 | Garcia | G01S 1/68 342/450 |
| 2008/0281668 A1 | 11/2008 | Nurminen | |
| 2009/0197684 A1 | 8/2009 | Arezina et al. | |
| 2009/0213771 A1 | 8/2009 | Celentano et al. | |
| 2010/0022308 A1 | 1/2010 | Hartmann et al. | |
| 2010/0027521 A1 | 2/2010 | Huber et al. | |
| 2010/0039929 A1 | 2/2010 | Cho et al. | |
| 2010/0048242 A1* | 2/2010 | Rhoads | G06F 17/30244 455/556.1 |
| 2010/0063854 A1 | 3/2010 | Purvis et al. | |
| 2010/0121567 A1 | 5/2010 | Mendelson | |
| 2010/0167771 A1 | 7/2010 | Raghothaman et al. | |
| 2010/0287033 A1 | 11/2010 | Mathur | |
| 2010/0302056 A1 | 12/2010 | Dutton et al. | |
| 2010/0305855 A1 | 12/2010 | Dutton et al. | |
| 2010/0331016 A1 | 12/2010 | Dutton et al. | |
| 2011/0078167 A1* | 3/2011 | Sundaresan | G06F 17/2785 707/765 |
| 2011/0103360 A1 | 5/2011 | Ku et al. | |
| 2012/0115512 A1 | 5/2012 | Grainger et al. | |
| 2012/0122476 A1 | 5/2012 | Lee et al. | |
| 2013/0003572 A1 | 1/2013 | Kim et al. | |

OTHER PUBLICATIONS

"Tracking Cookie." Wikipedia. http://en.wikipedia.org/wiki/Tracking_cookie. May 24, 2009.

Blom et al. "Transmission Power Measurements for Wireless Sensor Nodes and their Relationship to Battery Level." Symposium on Wireless Communication Systems. pp. 342-345, Sep. 7, 2005.

"Wi-Fi Location-Based Services—Design and Deployment Considerations." 2006 Cisco Systems. Accessed Dec. 2008. https://learningnetwork.cisco.com/docs/DOC-3418.

"Location in SIP/IP Core Architecture." Open Mobile Alliance. Sep. 4, 2008. Accessed Dec. 2008. http://www.openmobilealliance.org/technical/release_program/locsip_archive.aspx.

Want et al. "The Active Badge Location System." ACM Transactions on Office Information Systems (TOIS) vol. 10. No. 1, pp. 91-102, Jan. 1992.

Youssef et al. "Location-Clustering Techniques for WLAN Location Determination Systems." 2006. http://wrc.ejust.edu.eg/papers/ijca.pdf.

Vegni et al. "Local Positioning Services on IEEE 802.11 Networks." Radio Engineering, pp. 42-47, vol. 17, No. 2, Jun. 2008.

Ladd et al. "On the Feasibility of Using Wireless Ethernet for Indoor Localization." IEEE Transactions on Robotics and Automation, pp. 555-559, vol. 20, Issue 3, No. 3, Jun. 2004.

Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminals-using-rssi-between-terminals/330959.

Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.

Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.

Li et al. "A New Method for Yielding a Database of Location Fingerprints in WLAN" IEE Communications Proceedings, pp. 580-586, vol. 152, Issue 5, Oct. 7, 2005.

Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.

Muthukrishnan, et al. "Sensing motion using spectral and spatial analysis of WLAN RSSI." Proceedings of the 2nd European conference on Smart sensing and context. 2007. pp. 62-76.

Capkun et al. "Mobility Helps Peer-to-Peer Security." IEEE Transactions on Mobile Computing. vol. 5, Issue 1, pp. 43-51, Jan. 2006.

Milojicic et al. "Peer-to-Peer Computing" Jul. 10, 2002. https://www.hpl.hp.com/techreports/2002/HPL-2002-57R1.pdf.

"The New Normal of Retailing: The Rise of the Mobile Shopper." Next Generation Retail Summit. 2010. http://www.ngrsummit.com/media/whitepapers/Microsoft_NGRUS.pdf.

Lamarca et al. "Place Lab: Positioning Using Radio Beacons in the Wild." Pervasive 2005, LNCS 3468, pp. 116-133, 2005.

Borriello et al. "Delivering Real-World Ubiquitous Location Systems." Communications of the ACM. pp. 36-41, vol. 48, Issue 3, Mar. 2005.

Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.

Hightower et al. "Practical Lessons from the Place Lab." IEEE Pervasive Computing. pp. 32-39, vol. 5, Issue 3, Jul.-Sep. 2006.

Hile et al. "Indoor Location Estimation with Placelab." http://www.cs.washington.edu/education/courses/cse590gb/04wi/projects/hile-liu/. Jan. 8, 2004. Accessed on Sep. 25, 2008.

Kang "Extracting Places from Traces of Locations." ACM Sigmobile Mobile Computing and Communications Review. vol. 9, Issue 3, Jul. 2005.

Lamarca et al. "Self-Mapping in 802.11 Location Systems." UbiComp 2005: Ubiquitous Computing Lecture Notes in Computer Science, 2005, vol. 3660/2005, 903, DOI: 10.1007111551201_6.

Otsason et al. "Accurate GSM Indoor Localization." Ubiquitous Computing 2005, LNCS 3660, pp. 141-158, 2005.

Varshavsky et al. "Are GSM Phones the Solution for Localization?" 7th IEEE Workshop on Mobile Computing Systems and Applications, 2006. pp. 34-42, Aug. 1, 2005.

Chawathe et al. "A Case Study in Building Layered DHT Applications." Proceedings of the 2005 conference on Applications, technologies, architectures, and protocols for computer communications. vol. 35, Issue 4, Oct. 2005.

(56) References Cited

OTHER PUBLICATIONS

Lamarca et al. "Finding Yourself: Experimental location technology relies on Wi-Fi and cellphone signals instead of orbiting satellites." Dec. 2004. http://spectrum.ieee.org/computing/networks/finding-yourself.

Letchner et al. "Large-Scale Localization from Wireless Signal Strength." In Proceedings of the National Conference on Artificial Intelligence (AAAI), 2005.

Welbourne et al. "Mobile Context Inference Using Low-Cost Sensors." Location and Context-Awareness Lecture Notes in Computer Science, 2005, vol. 3479/2005, pp. 95-127.

Balakrishnan et al. "Lessons from Developing and Deploying the Cricket Indoor Location System." Nov. 7, 2003. http://www.sds.lcs.mit.edu/projects/cricket/V1Exp.pdf.

Cheng et al. "Accuracy Characterization for Metropolitan-scale Wi-Fi Localization." Proceedings of the 3rd international conference on Mobile systems, applications, and services. 2005.

"Ekahau Positioning Engine 4.2." 2008. http://www.nowire.se/images/produktblad/ekahau/datasheet_epe_42_en_11022008_lo.pdf. Sep. 29, 2008.

"Internet Industry Interacting Gambling Code: A Code for Industry Co-Regulation in the Area of Internet Gambling Content Pursuant to the Requirements of the Interactive Gambling Act 2001." Internet Industry Association. Dec. 2001.

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.

"Wireless Network." Wikipedia. http://en.wikipedia.org/wiki/Wireless.sub.--network. Nov. 17, 2008.

Chen et al. "Practical Metropolitan-Scale Positioning for GSM Phone." UbiComp 2006: Ubiquitous Computing Lecture Notes in Computer Science, 2006, vol. 4206/2006, pp. 225-242.

HTTP Cookie, redirected from tracking cookie as downloaded from wikipedia, 41 pages.

Interactive Gambling Industry Code, Dec. 2001, 7 pages.

Ladd et al. "Using Wireless Ethernet for Localization." IEEE/RJS International Conference on Intelligent Robots and Systems. 2002.

Lafargue, Edouard. "Wireless Network Audits using Open Source Tools". SANS Institute 2003. Accessed Dec. 2008. http://www.sans.org/reading.sub.--room/whitepapers/auditing/wireless-netw- ork-audits-open-source-tools.sub.--1235.

Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201.sub.--6.

Wireless Network as downloaded from wikipedia.com, pp. 5 pages.

\* cited by examiner

400

| Attribute_Group | |
|---|---|
| Attribute_ID | 11111111 |
| Attribute_Category | Sport |
| Attribute Value | Skiing |

| User_Attribute_Group | |
|---|---|
| User_ID | 12345678 |
| Attribute_ID | 11111111 |

| Content_Rating_Time | |
|---|---|
| Content_ID | 00000001 |
| Time | 2011-03-28 11:01 |
| Relevance_ Weight | 95 |

CONTENT RELEVANCE WEIGHTING SYSTEM

CROSS-REFERENCE

This patent application claims the benefit of provisional patent application 61/482,834 entitled CONTENT RELEVANCE WEIGHTING SYSTEM filed on May 5, 2011;

this patent application claims the benefit of provisional patent application 61/427,753 entitled INTERACTIVE DISPLAY SYSTEM filed on Dec. 28, 2010;

this patent application claims the benefit of provisional patent application 61/427,755 entitled INTERACTIVE DISPLAY SYSTEM filed on Dec. 28, 2010;

this patent application claims the benefit of provisional patent application 61/454,664 entitled USER INTERFACE FOR GEOFENCE-ASSOCIATED CONTENT filed on Mar. 21, 2011;

this patent application claims the benefit of provisional patent application 61/472,054 entitled CONTENT RELEVANCE WEIGHTING SYSTEM filed on Apr. 5, 2011;

this patent application is a continuation-in-part of patent application Ser. No. 13/218,256 entitled SYSTEM AND METHOD FOR HANDSET POSITIONING WITH DYNAMICALLY UPDATED WI-FI FINGERPRINTING filed on Aug. 25, 2011 that claims the benefit of provisional patent application 61/376,936 filed on Aug. 25, 2010, provisional patent application 61/351,770 filed on Jun. 4, 2010, and provisional patent application 61/352,242 filed on Jun. 7, 2010;

this patent application is a continuation-in-part of patent application Ser. No. 13/153,214 entitled MERCHANT CONTROLLED PLATFORM SYSTEM AND METHOD filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 13/153,238 entitled MERCHANT CONTROL PLATFORM SYSTEM AND METHOD WITH LOCATION-BASED CONTENT DELIVERY filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application of patent application Ser. No. 13/153,248 entitled LOCATION POSITIONING ENGINE SYSTEM AND METHOD filed on Jun. 3, 2011 that claims the benefit of the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 12/821,852 entitled MOBILE AUTONOMOUS DYNAMIC GRAPHICAL USER INTERFACE APPLICATION FRAMEWORK filed on Jun. 23, 2010 no U.S. Pat. No. 8,738,024 that claims the benefit of provisional patent application 61/223,565 filed on Jul. 7, 2009;

this patent application is a continuation-in-part of patent application Ser. No. 12/413,547 entitled MOBILE AUTONOMOUS DYNAMIC GRAPHICAL USER INTERFACE filed on Mar. 28, 2009 now U.S. Pat. No. 8,942,995 that claims the benefit of provisional patent application 61/040,661 filed on Mar. 29, 2008;

this patent application is a continuation-in-part of patent application Ser. No. 11/948,007 titled PLAYER TRACKING USING A WIRELESS DEVICE FOR A CASINO PROPERTY filed on Nov. 30, 2007 that claims the benefit of provisional patent application 60/872,351 titled filed on Nov. 30, 2006; and the above patent applications hereby incorporated by reference in this patent application.

FIELD

The present invention relates to a system and method for delivering relevant content to a wireless handset. More particularly, the present invention relates to a system and method for adjusting a relevance weight value for a content item based on the location of a user reacting to the content.

BACKGROUND

Services that provide ranked lists of results are well known, for example, in the areas of internet search and advertising. Such services may gauge user response to the provided content to improve the relevance of ranked results provided to the users of the service. Passive user responses, such as selection of content, manipulation of content, or time spent viewing particular content are monitored and the relevance weighting applied to the content is adjusted accordingly. Active user feedback, such as a rating provided by the user for a particular content item, is also used to impact relevance weighting for content.

User profile information such as user interest, user location, etc. has been used in existing content delivery systems to impact the relevance weighting of content. However, existing systems lack means for adjusting relevance weighting of content for a group of users having a shared profile attribute based on both active and passive user responses to received content.

Moreover, there remains a need for a content delivery system that ranks content based on the location of the user accessing the content.

SUMMARY

A system for adjusting a relevance weight value for a content item is described. The system comprises a network. The system further comprises a content storage module communicatively coupled to the network. The content storage module is configured to store a plurality of content items. The content storage module is further configured to store an initial relevance weight value and a location in association with each content item. The system also comprises a content delivery module communicatively coupled to the network. The content delivery module is configured to deliver a plurality of content items to a wireless device via the network. The system further comprises a location detection module communicatively coupled to the network. The location detection module is configured to determine a location of the wireless device. The wireless device comprises a display to show the content items and a user interface to receive feedback input associated with a content item. The user interface comprises a positive review input corresponding to a positive feedback input and a negative review input corresponding to a negative feedback input. A relevance weight adjustment module is communicatively connected to the network. The relevance weight module is configured to perform one of a subtraction operation or an addition operation. The subtraction operation comprises subtracting a first point value from the relevance weight value associated with the location and the content item when the negative review input is selected. The addition operation comprises adding a first point value to the relevance weight value associated with the location and the content item when the positive review input is selected.

In another embodiment, a system for adjusting a relevance weight value for a content item comprises a means for displaying content items.

A method for adjusting a relevance value for a content item is also described. The method comprises storing a plurality of content items with a content storage module communicatively coupled to a network. The method further comprises storing an initial relevance weight value and a location in association with each content item. A plurality of content items are delivered to a wireless device via the network. A location detection module determines the location of the wireless device. A plurality of content items are displayed on the wireless device. A feedback input is received with a user interface of the wireless device. The user interface comprises a positive review input corresponding to a positive feedback input for a content item and a negative review input corresponding to a negative feedback input for a content item. When the negative review input is selected, a first point value is subtracted from the relevance weight value associated with the location and the content item. When the positive review input is selected, a first point value is added to the relevance weight value associated with a location and a content item.

FIGURES

The present invention will be more fully understood by reference to the following drawings which are for illustrative, not limiting, purposes.

FIG. 4 shows an illustrative database table entry for associating a user identification with an attribute group.

FIG. 5 shows an illustrative database table entry for associating a user identification with an attribute group.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A relevance weighting system for content is described. Content items are accessible to a plurality of users having user profiles. The content items are delivered via a network to a computing device, such as a wireless handset or other wireless device. The user of the wireless handset may actively provide feedback for a content item. Based on the feedback received, a relevance weight value associated with the content item is adjusted. One or more passive measures of user response to the content item may also be used to adjust the relevance weight value associated with the content item.

According to one embodiment, a relevance weight value is associated with a location and with a content item, for example, in a database table. When positive feedback is received, a predetermined point value is added to the relevance weight value associated with the content item and the location. Similarly, if negative feedback is received, a predetermined point value is subtracted from the content item relevance weight value associated with the content item and the location.

The location may be a location of the wireless handset. In one embodiment, the location is determined based on signals received by the wireless handset, such as wi-fi signals. In another embodiment the location of the wireless handset is determined using Global Positioning System (GPS) data. The location may alternatively be determined based on information provided by the user of the wireless handset via a user interface or through a user profile.

In an alternative embodiment, if a content item is delivered more than a predetermined number of times without being selected, a predetermined point value is subtracted from a relevance weight value associated with the content item.

In another embodiment, if a content item is selected, a predetermined point value is added to a relevance weight value associated with the content item.

It will be recognized that the relevance weight value may be adjusted according to a combination of the embodiments described above. In each of the described embodiments, the relevance weight value may be adjusted for the association between a content item and a location. Alternatively, the relevance weight value may be adjusted for each instance of a content item (e.g., for each location with which the content item is associated).

Figure 1:
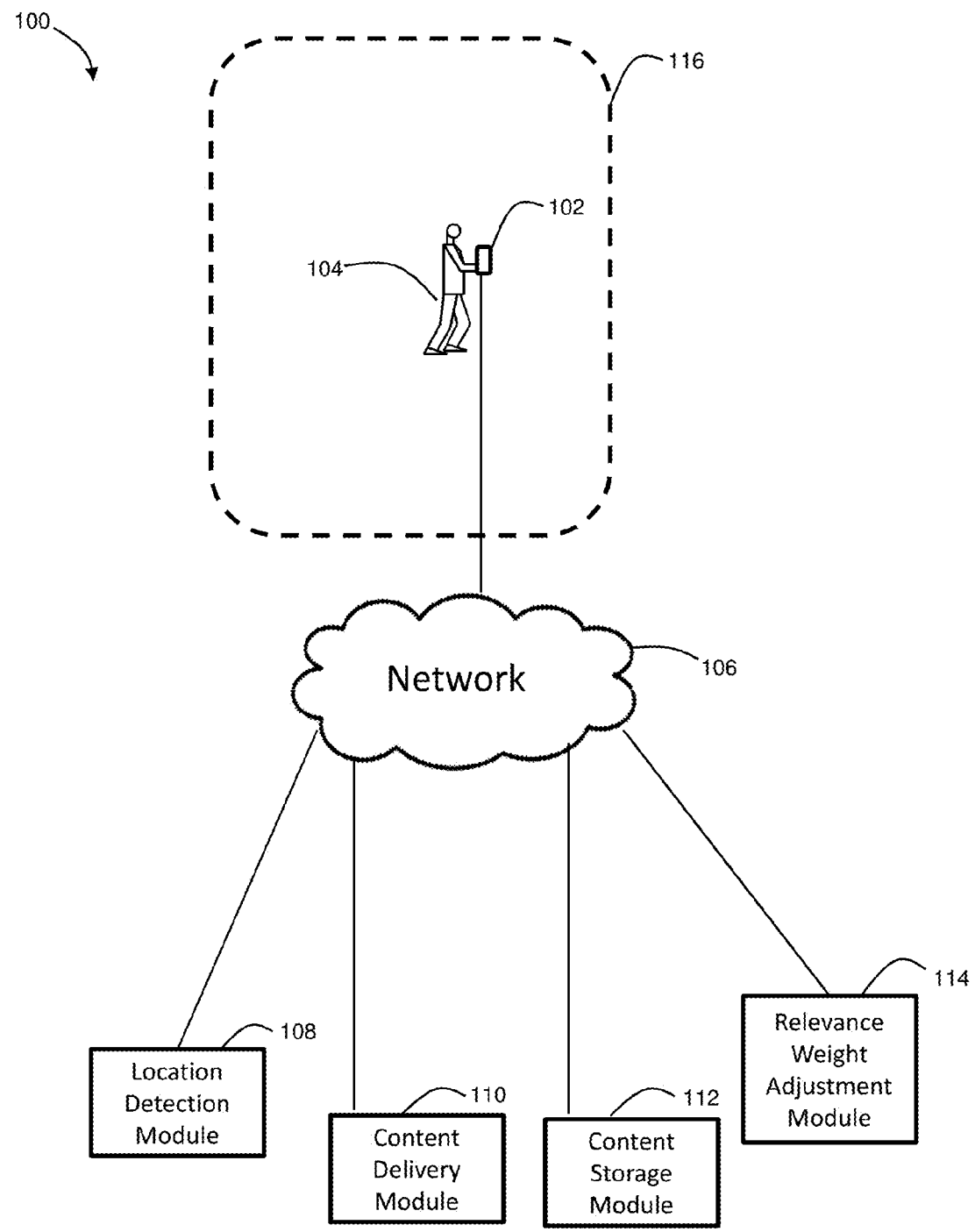
FIG. 1 shows a system diagram of an illustrative content item relevance weighting system.

Referring to FIG. 1, a system diagram of an illustrative content item relevance weighting system is shown. Wireless handset 102 is operated by user 104. The wireless handset may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system.

Location detection module 108 is communicatively coupled to network 106. The location detection module is configured to determine the location of wireless handset 102 based on information transmitted from the wireless handset to the location detection module via the network. In some embodiments, the location detection module is configured to determine whether wireless handset 102 is located within a geofence, such as geofence 116. A geofence is a virtual geographic boundary line delineating a geographic area. The area within the geofence may be referred to as a content bubble.

Content delivery module 110 transmits content items to wireless handset 102 via network 108. In some embodiments, content items are delivered to the wireless handset periodically. In other embodiments, the content items may be delivered when an event occurs, such as a wireless handset 102 entering a geofence 116.

Content storage module 112 stores a plurality of content items. For example, the content storage module may comprise a plurality of tables in a database. The database is typically stored in memory on a server.

Relevance weight adjustment module 114 adjusts a relevance weight value associated with a content item. For example, the relevance weight adjustment module may add to or subtract from a relevance weight value stored in a database table in association with a content item. In some embodiments, the database table stores an association between a content item, a location, and a relevance weight value.

Location detection module 108, content delivery module 110, content storage module 112 and relevance weight adjustment module 114 each run on a processor, for example, a processor of a server. In some embodiments, modules 108-114 run on a single processor. In other embodiments, one or more of the modules may run on separate processors.

The wireless handset transmits information using wireless communication including, by way of example and not of limitation, CDMA, WCDMA, GSM or UMTS or any other wireless communication system such as wireless local area network (WLAN), Wi-Fi or WiMAX. Network 108 may be a local area network ("LAN"), wide area network ("WAN"), or any other network to facilitate communication among computers and wireless communication devices.

Figure 2:
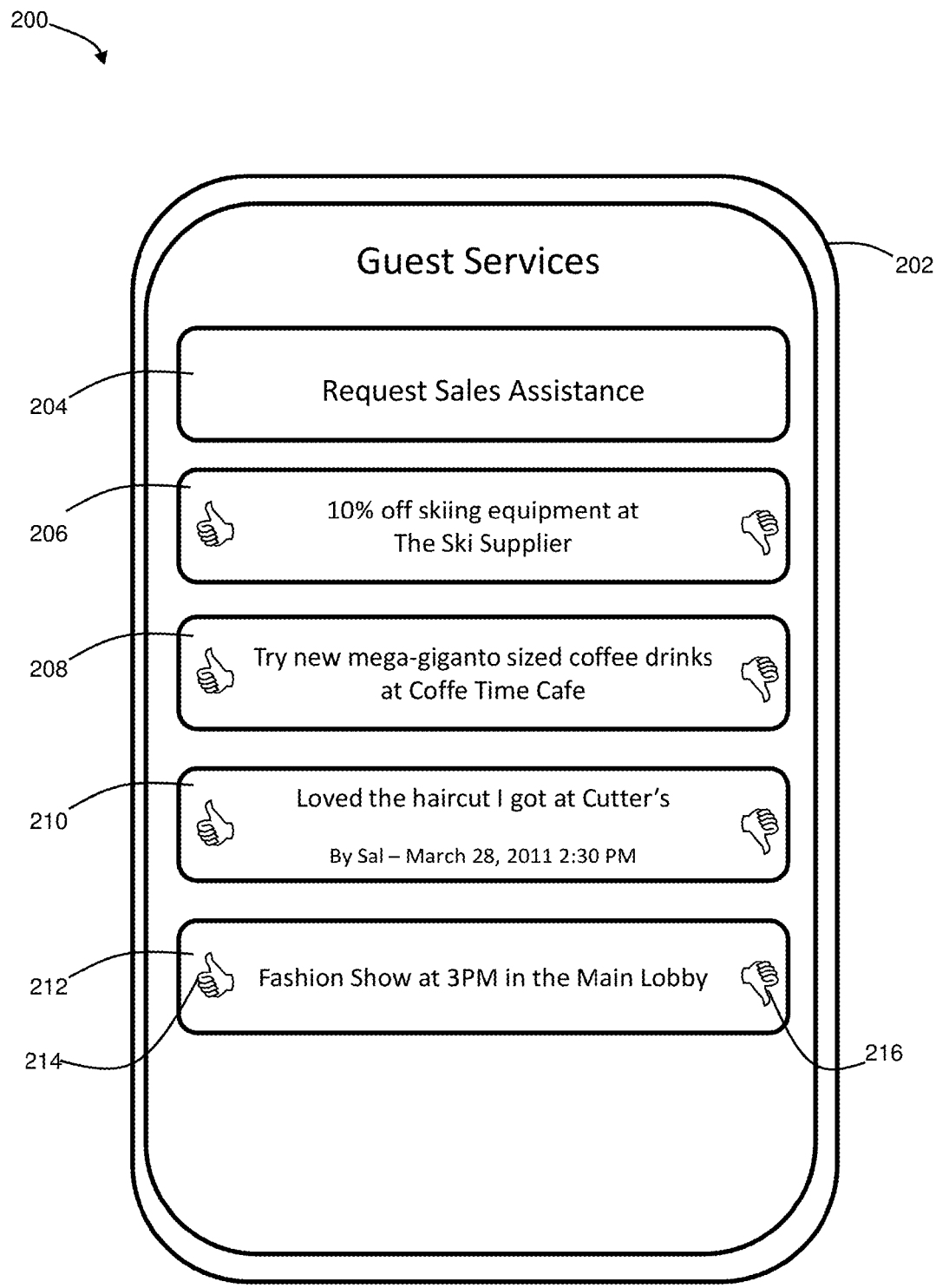
FIG. 2 shows an illustrative user interface for displaying content items on a wireless handset.

Referring now to FIG. 2, an illustrative user interface 200 for displaying content items on wireless handset 102 is shown. The user interface presents a plurality of content items to the user of wireless handset 102. A content item may be any information or product promotion shared with or created by a user. For example, a content item may include text, audio, video, image or a link such as a link to an external website, link to an interactive map or link to one or more content items. In some embodiments, a content item may be an application, such as a purchasing or gaming interface. A content item may be information provided by a facility to a user, such as content items 206, 208 and 212. Alternatively, a content item may be user-created content, such as content item 210. In some embodiments, a content item may activate command function or request function, such as content item 204.

Illustrative user interface 200 is shown displaying a wireless handset having a touchscreen-type interface; however, it will be appreciated that the user interface may be displayed on any wireless device having a display and a user input means (such as keypad, touchscreen interface, or stylus). Illustrative content items 204-212 are selectable items such as virtual buttons that are activated when the user touches the button on a touchscreen or selects the button with a pointing device.

A feedback input may be displayed proximate to or in conjunction with a content item. The feedback input allows a user to react to the content items displayed. In some embodiments, a positive feedback input, a negative feedback input, or both are displayed. The feedback inputs may be displayed, for example, as "thumbs up" and "thumbs down" symbols displayed on a user-created content item button, as shown at 214 and 216, respectively. The thumbs up and thumbs down input prompts are operable separately from the content item button. When a user selects a feedback input prompt, the wireless handset transmits a feedback message via the network to the remote server 106 indicating the feedback response, e.g., whether the feedback was positive ("thumbs up") or negative ("thumbs down"). The feedback message may also comprise information about the user, such as a unique user identification (e.g., the User_ID indicated in FIG. 3 below). Alternative feedback input means, such as a system that allows a user to rate a content item on a scale, such as a scale of one to ten or a scale of one to five, may be used.

A "positive feedback input" may also be referred to as a positive review. A "negative feedback input" as used herein may refer to a negative review.

Typically, the feedback input is used to modify a relevance weight value stored in association with the content item. The feedback input may be used to rank content to be displayed in the user interface. The content items transmitted from the remote server to the wireless handset may be filtered by relevance weight value such that a predetermined number of highest ranked content items are returned or such that only those content items exceeding a predetermined threshold are returned.

Figure 3:
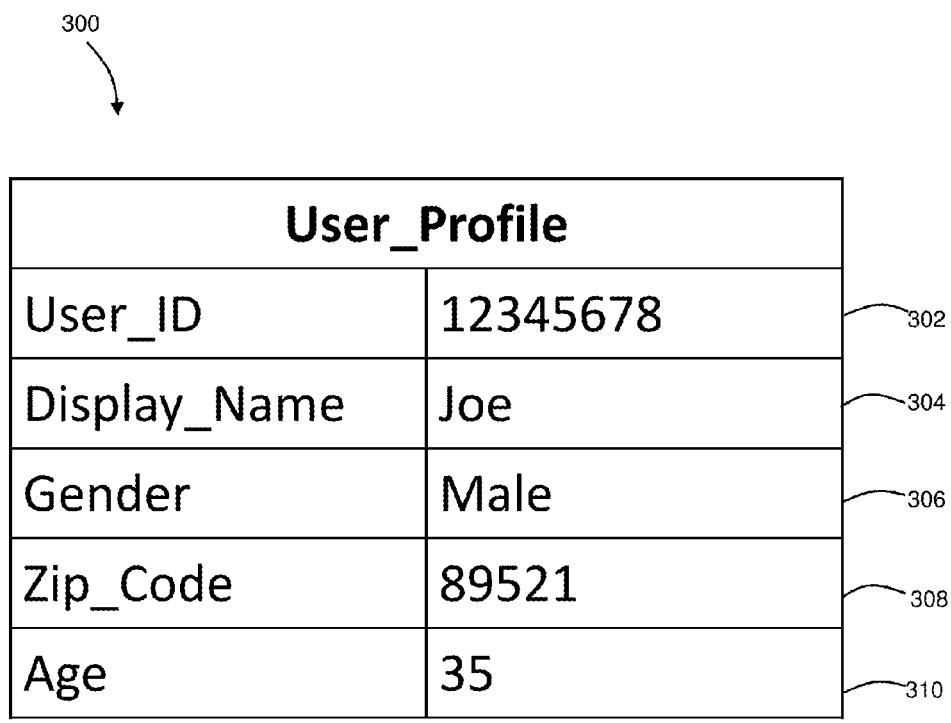
FIG. 3 shows an illustrative database table entry for a user profile.

Referring now to FIG. 3, an illustrative database table entry 300 for a user profile is shown. The table may be populated by the user with information provided via a user profile interface on the wireless handset 102. In some embodiments, the user enters user profile information using an interface on a home computer or other device having access to network 108. User profile information is transmitted via network 108 to a database, such as a relevance engine database residing on remote server 106. The user profile information may be stored in the database in a database table, such as a User_Profile database table. The User_Profile table comprises the field user_ID 302. The illustrative entry 300 in the User_Profile table additionally comprises fields Display_Name 304, Gender 306, Zip_Code 308 and Age 310. In some embodiments, the User_Profile table stores additional information such as a user address, user phone number, user name, etc. In some embodiments, a birthday or an age range is stored for the user rather than an age of the user.

Referring to FIG. 4, an illustrative database table entry 400 for an attribute group is shown. The Attribute_Group table stores a unique identifier for each attribute group available to be associated with a user. Attribute groups for a user may include information provided by the user, such as a location of the user, a user interest, an age of the user or an age group to which the user belongs. In some embodiments, the attribute groups include information collected about a user, for example, information from the user's transaction history with a merchant.

The Attribute_Group table is stored in a database, such as a relevance engine database. The Attribute_Group table comprises fields Attribute_ID 402 and Attribute_Value 406. The illustrative entry 400 in the Attribute_Group table additionally comprises the field Attribute_Category 404. According to the illustrative entry in the Attribute_Group table, the attribute with the Attribute_ID number 11111111 is an attribute with attribute category "sport" and attribute value "skiing." If the user indicates skiing as an interest, the attribute ID for skiing may be associated with the user ID in a User_Attribute_Group database table as indicated in FIG. 5.

Referring to FIG. 5, an illustrative database table entry 500 for associating a user identification with an attribute group is shown. The User_Attribute_Group table comprises fields Attribute_ID 502 and Attribute_ID 504. The illustrative entry in the User_Attribute_Group table associates user ID "12345678" with attribute id "11111111," indicating that user "Joe" having user ID 12345678 (as indicated in FIG. 2) is associated with the attribute skiing, identified by attribute ID 11111111. The table entry may have been created when Joe indicated an interest in skiing using a user profile interface or other user interface. Alternatively, a merchant or other content administrator may have determined that Joe is interested in skiing based on, for example, Joe's purchases of skiing equipment from the merchant, and created the User_Attribute_Group table entry shown accordingly.

Figure 6:
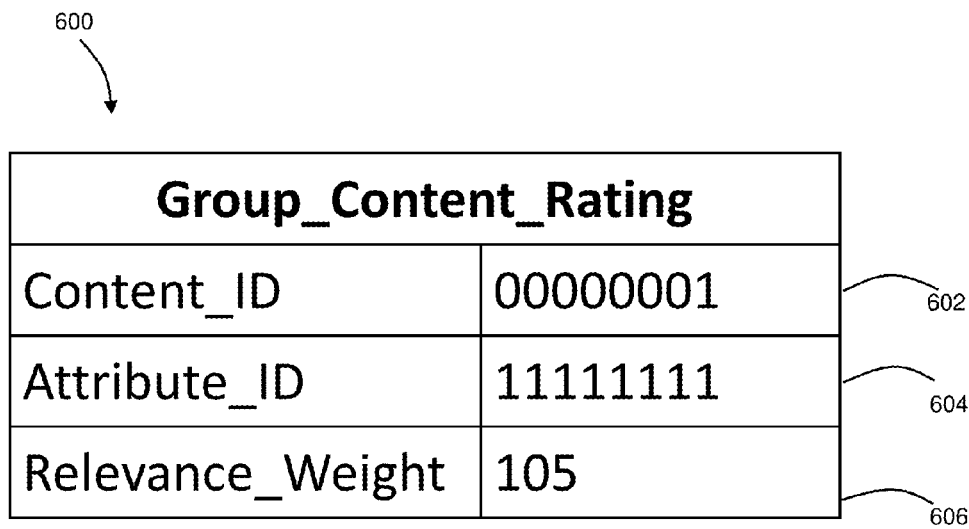
FIG. 6 shows an illustrative database table entry for associating a content item with an attribute group.

Referring to FIG. 6, an illustrative database table entry 600 for associating a content item with an attribute group and storing a relevance weight value for the association is shown. The Group_Content_Rating table comprises fields Content_ID 602, Attribute_ID 604 and Relevance_Weight 606. Content_ID has value "00000001," indicating a unique identification for a content item. Illustrative content items are shown in FIG. 2. For example, content item 00000001 may be text advertising a sale on skiis. In the illustrative entry, content 00000001 in association with attribute 11111111 (skiing) has a relevance weight value of 105.

By way of illustration, user Joe (having user ID 12345678) has indicated an interest in skiing, resulting in the User_Attribute_Group entry shown in FIG. 4. Content item 00000001 may be an advertisement for a sale on skiing equipment, such as content item 206 shown in FIG. 2. When Joe provides positive feedback for content item 00000001, all attribute groups associated with Joe and the content item receive an increase to the relevance weight value. If, for example, an initial relevance weight value of 100 is used for the association between Content_ID 00000001 (e.g., the skiing advertisement) and Attribute_ID 11111111 (e.g., skiing), the positive feedback results in a point increase, for example, a five point increase, resulting in an adjusted relevance weight value of 105. Methods for adjusting Relevance_Weight 606 are described in more detail with reference to FIGS. 9 and 10.

Figure 7:
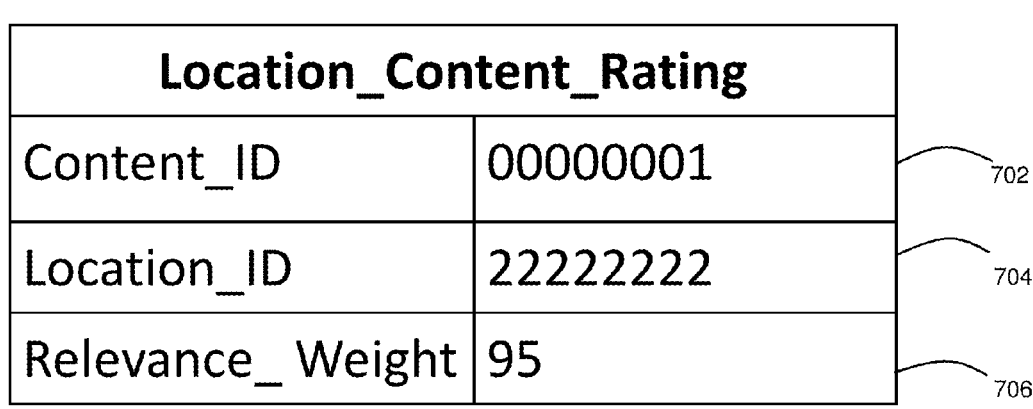
FIG. 7 shows an illustrative database table entry for associating a content item with a location identifier.

Referring to FIG. 7, an illustrative database table entry 700 for associating a content item with a location identifier and storing a relevance weight value for the association is shown. The Location_Content_Rating table comprises fields Content_ID 702, Location_ID 704 and Relevance_Weight 706. Location_ID has value "22222222," indicating a unique identification for a location.

In some embodiments, the Location_ID is a unique identification associated with a geofence 116. For example, a database table entry may associate a set of coordinates corresponding to the area bounded by a geofence with a unique Location_ID. The wireless handset 102 is configured to determine whether it is located within a geofence. In some embodiments, the wireless handset may receive content items associated with the geofence in which the wireless handset is located.

In one exemplary embodiment, the location of the wireless handset is determined based on signals received by the wireless handset from beacons. The beacon is typically a radio frequency transmitter, for example, a wireless access point, femtocell, or other device that allows devices to connected to a wireless network using Wi-Fi, Bluetooth, or other wireless standards. The wireless handset 102 transmits to location detection module 108 a location message comprising a signal strength and signal identifier associated with each beacon detected by the wireless handset. Based on the information received in the location message, the location detection module determines the location of the wireless handset. Various methods for determining the location of a wireless handset using beacons are described in U.S. provisional patent application Ser. Nos. 61/652,242 and 61/673,936.

Figure 10:
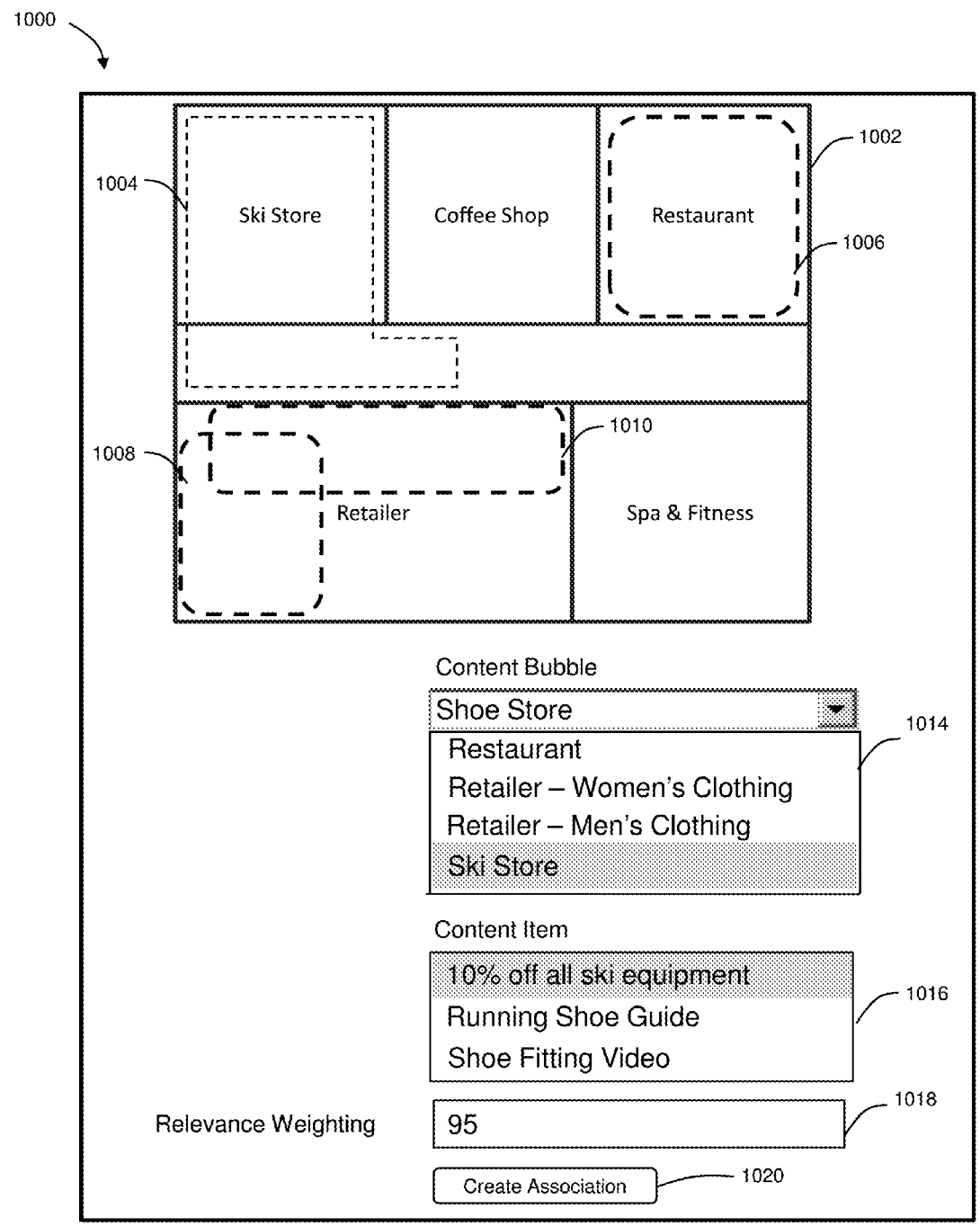
FIG. 10 shows an illustrative geofence creation interface.

In some embodiments, the location of the wireless handset relative to a geofence such as geofence 116 is determined. An interface for indicating the location of geofences and associating content with geofences are shown in FIG. 10.

In alternative embodiments, Location_ID may be associated with a zip code city, or other location information entered in a user profile. In other embodiments, a Location-ID may be associated with a set of GPS coordinates as determined by the wireless handset or a distance range surrounding any of the preceding (e.g., a 300 foot radius surrounding a set of GPS coordinates).

In some embodiments, the Location_ID is associated with a building name, room name, business name, attraction name, or other named location. The named location may be entered into a user interface on the wireless handset or selected from a menu displayed on the wireless handset.

In some embodiments, Location_ID may indicate a location determined by scanning a code, such as a QR code, with the wireless handset. In other embodiments, Location_ID may identify a location as determined from an image of the environment captured with the wireless handset.

By way of illustration, content item 00000001 may be an advertisement for a sale on skiing equipment, such as content item 206. In one example, the wireless handset displaying content item 206 is located in a geofence encompassing the ski store to which the advertisement applies. If the user of the handset provides negative feedback, the relevance weight value associated with location (e.g., the ski store geofence) and the content item (e.g. the ski equipment advertisement) is decreased by a predetermined point value. If, for example, an initial relevance weight value of 100 is used for the association between Content_ID 00000001 and Location_ID 22222222, the negative feedback results in a point decrease, for example, a five point decrease, resulting in an adjusted relevance weight value of 95. A method for adjusting Relevance_Weight 706 is described in more detail with reference to FIGS. 11-12.

Figures 8A, 8B:
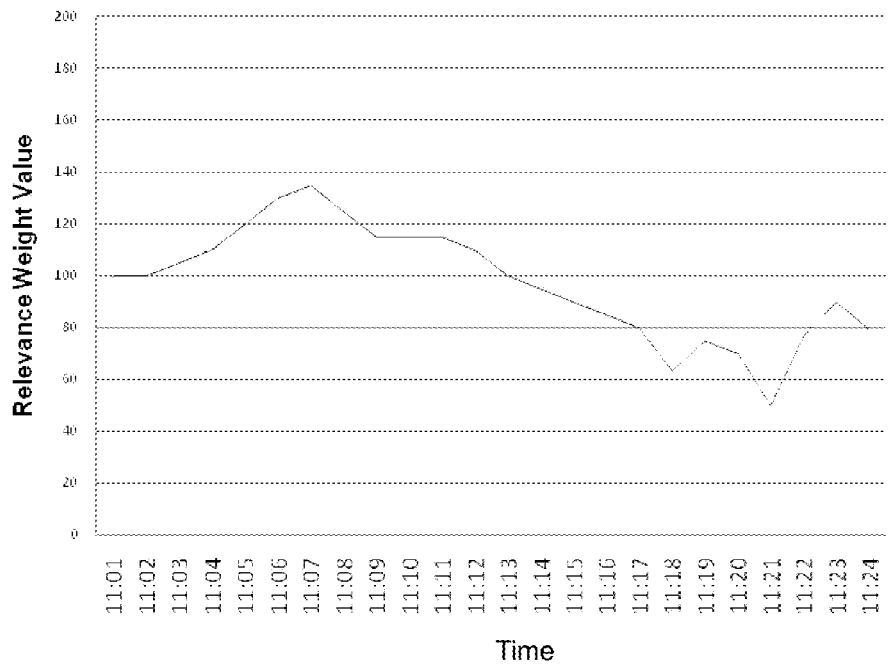
FIG. 8A shows an illustrative database table entry for associating a content item with a time a relevance weight value.
FIG. 8B shows an illustrative graph showing a change in relevance weight value for a content item over time.

Referring now to FIG. 8A, an illustrative database table entry 800 for associating a content item with a time and a relevance weight value. The Content_Rating_Time table comprises fields Content_ID 802, Time 804 and Relevance_Weight 806. Each time the relevance weight for a content item changes, the relevance weight value and time are logged such that a record of the change in relevance weight for the content item over time as shown in FIG. 8B may be created. The Content_Rating_Time table may further comprise field Attribute_ID or Location_ID to allow the change in relevance weight value over time to be analyzed for a particular attribute group or location.

Referring to FIG. 8B, a graph showing a change in relevance weight value for a content item over time is shown. The graph shown in FIG. 8B may be created from the entries in the Content_Rating_Time table. The change in relevance weight value over time may be useful to content administrators in assessing the success of content items.

Figure 9:
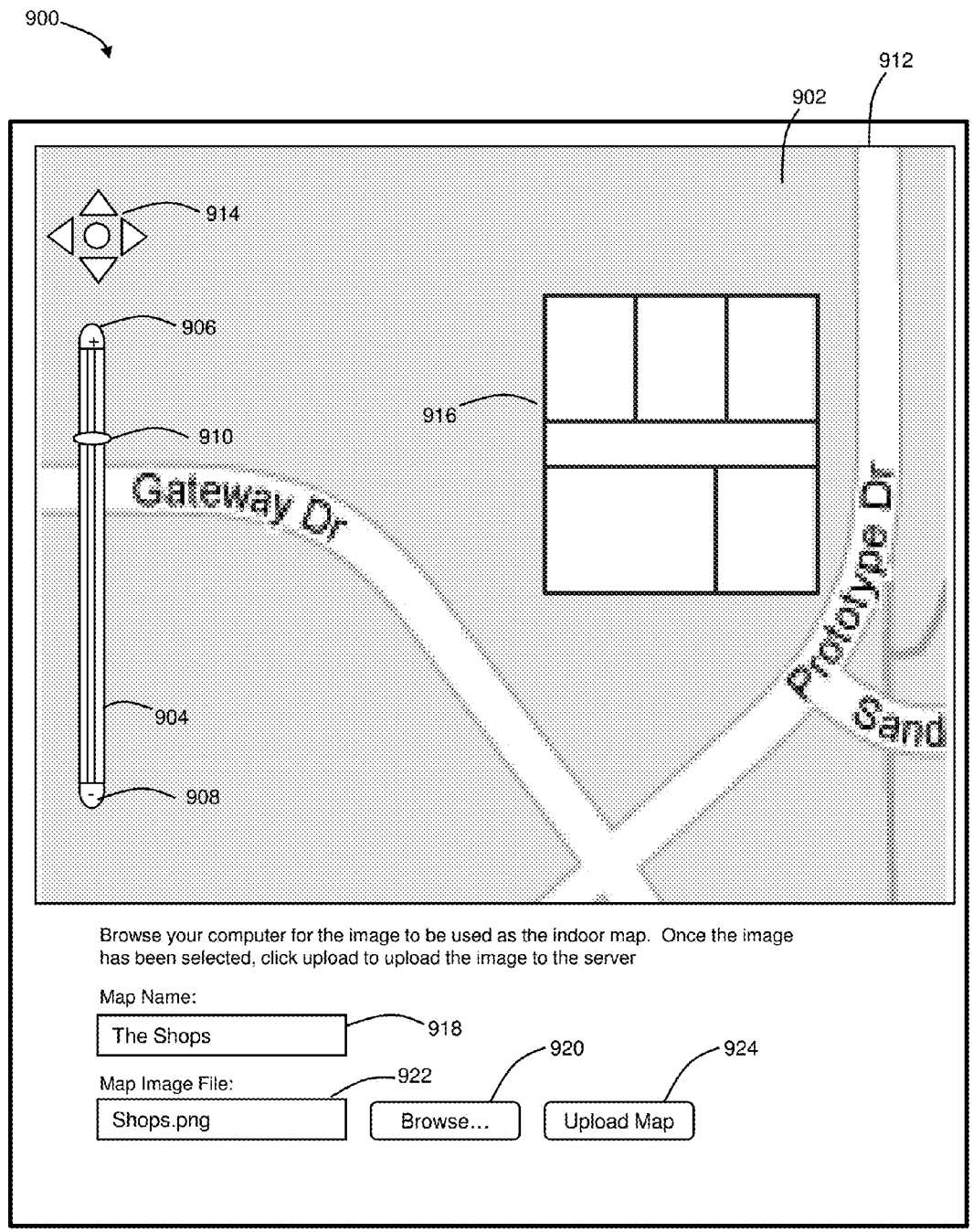
FIG. 9 shows an illustrative geographic information system interface.

Referring now to FIG. 9, an illustrative geographic information system (GIS) interface 900 is shown. A content administrator for a premises may indicate the location of a premises map relative to a street map using the GIS interface. The content administrator may use magnification bar 904 to adjust the magnification of street map 902 to the appropriate scale for placement of the premises map. Magnification bar 904 comprises increase magnification indicator 906, decrease magnification indicator 908, and sliding magnification control 910. The content administrator may slide the sliding magnification control 910 in the direction of the increase magnification indicator 906 to increase the level of magnification of the map and may slide the sliding magnification control 910 in the direction of the decrease magnification indicator 908 to reduce the level of magnification of the map. To change the position of the street map 902 within map window 912, navigation control 914 may be used. Navigation control 914 comprises an up arrow, a down arrow, a left arrow and a right arrow. To move the street map in the desired direction, the arrow pointing in the desired direction is mouse clicked. Navigation may additionally or alternatively be accomplished by mouse clicking on street map 902, holding down the mouse button, and moving the mouse to slide the map in the desired direction. It will be recognized that other methods for adjusting map magnification and map position within the map window may be used.

When the appropriate level of magnification has been reached, the content administrator may insert a merchant premises map image 916 over the street map and position the premises map relative to the street map. The content administrator may be prompted to enter a name for the premises map in a text box such as map name text box 918. The content administrator selects a map image file to insert over the street map. For example, the content administrator may click a browse button 920 to open a dialog box allowing the content administrator to choose a map image file from a file directory. When an image file has been selected, the name of the image file may appear in a text box as shown at 922. The content administrator may then upload the selected map, for example, by hitting an upload map button 924. After the map is uploaded, it appears within map window 912. The premises map image 916 may be resized and rotated with mouse controls or other interface controls. The content administrator may place the premises map image 916 in the appropriate position relative to street map 902. For example, the content administrator may place the premises map image by mouse clicking on the premises map image, holding down the mouse button, and dragging the premises map image to the desired position. It will be recognized that other methods for selecting a map image and positioning it at a desired location on a street map may be used. The position of premises map 916 relative to street map 902 is stored, for example, on a remote server. The level of magnification and position of street map 902 within map window 912 may also be stored. The image file or a string representing a path to the image file may also be stored. Additionally, the map name entered in text box 918 may be stored.

Referring to FIG. 10, an illustrative geofence creation interface 1000 is shown. A geofence is a virtual boundary indication inserted by a user on a premises map using a graphical user interface. The content administrator provides a map 1002, such as a premises floor plan, on which the geofences will be defined. The map may be provided by uploading an image file to the GIS interface as indicated in FIG. 10. The content administrator uses a shape drawing tool to define a geofence. The shape drawing tool may allow the content administrator to create rectangles, polygons, or other shapes overlayed on the premises map 1002. If the map has been uploaded into a GIS interface, the geofence may be stored as a set of coordinates (e.g, a longitude and latitude for each vertex of the geofence). After a geofence shape has been created, the content administrator may be prompted by the geofence application to enter an identifier for the geofence.

The geofence interface may comprise geofence selection drop down menu 1014 and content item selection drop down menu 1016. To create an association between a content item and a geofence, the desired geofence and the desired content item are selected from the geofence selection drop down menu and the content item selection drop down menu, respectively. In FIG. 10, geofences 1004, 1006, 1008 and 1010 have been defined, corresponding to the Ski Store, Restaurant, Retailer—Women's Clothing and Retailer—Men's Clothing, respectively.

In an illustrative example, the location "Ski Store" has been selected from geofence selection drop down menu 1014 and the content item "10% off all ski equipment" has been selected from content item menu 1016. Using relevance weighting box 1018, the content administrator may assign an initial relevance weight value to the geofence-content association created in tables 1014-1016. When the content administrator selects Create Association control 1020, an association has been created between ski equipment sale content item and the Ski Store geofence, indicated at 1004. For example, the database table entry shown in FIG. 7 may be created when the Create Association control is selected. An application, for example an application running on a server hosting the database, looks up the Location_ID associated with the location "Ski Store" and the Content_ID associated with content item "10% off all ski equipment" to enter the corresponding unique identifiers for Location_ID and Content_ID into table entry 700.

As the user moves through the shopping area indicated in premises map 1002, the user's wireless handset 102 periodically sends a location message to location detection module 108. The location detection module determines the location of the wireless handset based on whether the handset is located within a geofence such as geofence 1004. Content delivery module 110 may send content items associated with geofence 1004 to the wireless device when the wireless device is located within geofence 1004. When the user provides feedback on the content item associated with the geofence location, the relevance weight value associated with the content item and the location is adjusted.

Figure 11:
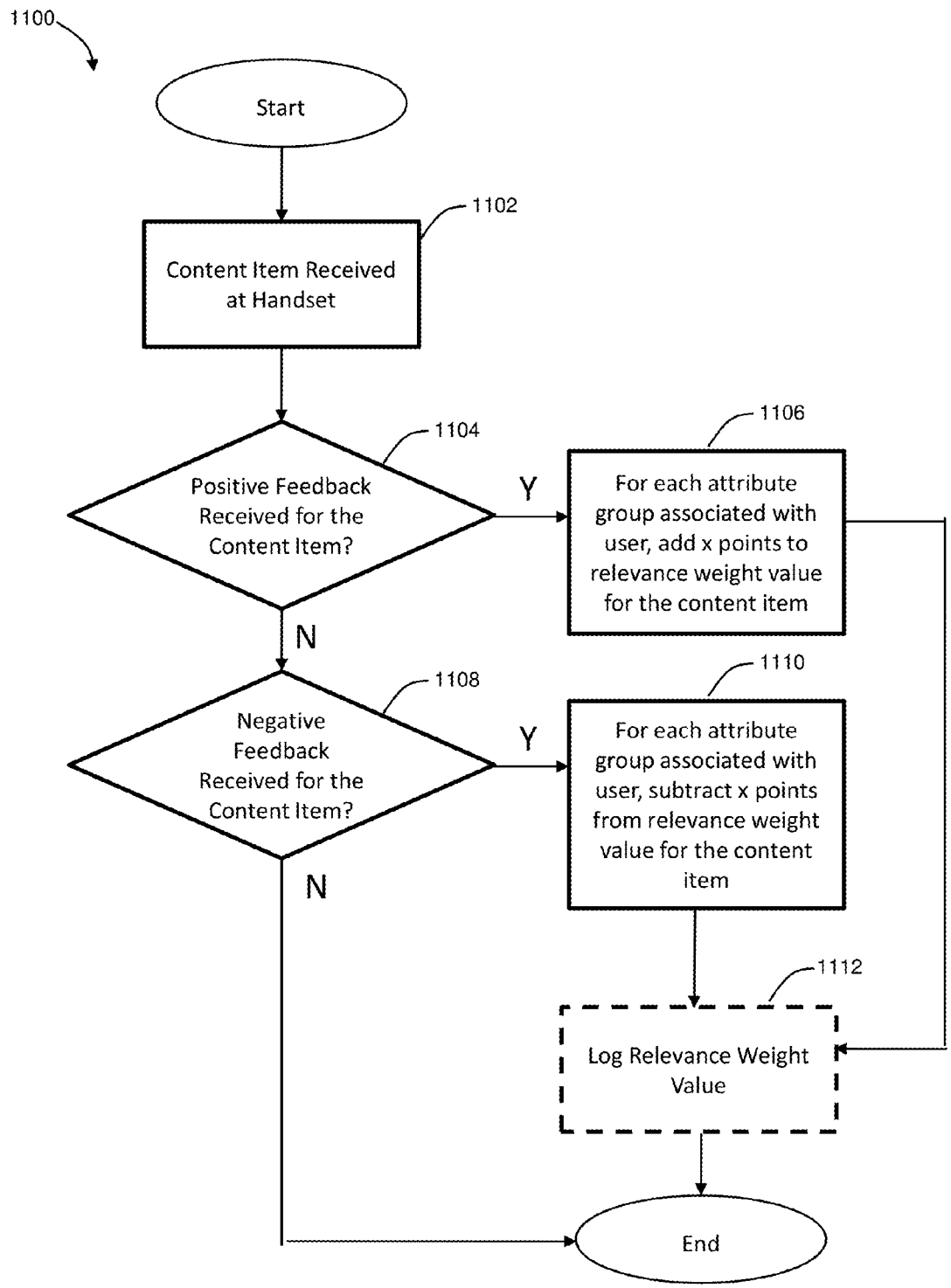
FIG. 11 shows an illustrative flow chart indicating a method for adjusting relevance weighting according to a first embodiment.

Referring now to FIG. 11, an illustrative flow chart indicating a method for adjusting relevance weighting according to a first embodiment is shown. The method begins at block 1102, at which a content item is received at the wireless handset 102. The content item may be one of a plurality of content items displayed on the handset. At decision diamond 1104, relevance weight adjustment module 114 determines whether positive feedback has been received from the wireless handset. If positive feedback has been received for a content item, the method proceeds to block 1106. At block 1106, for each attribute group associated with the user who provided the positive feedback, a point value x is added to the value of the Relevance_Weight field of the Group_Content_Rating entry having a Content_ID value matching the content item identifier and an Attribute_ID value matching the attribute identifier. Point value x may be any point value, for example, 5 points.

For example, if user 12345678 (display name "Jim") provides positive feedback for the content item having content identifier 00000001, all attribute groups associated with user 12345678 are located. Accordingly, the User_Attribute_Group table is queried to return all entries for user 12345678. Since the attribute having attribute identifier 11111111 is associated with user 12345678 in the User_Attribute_Group table, the relevance weight associated with Attribute_ID 11111111 will be modified for the selected content item. In the Group_Content_Rating table, the value of Relevance_Weight is adjusted for the entry having Content_ID 00000001 and Attribute_ID 11111111. Because positive feedback was provided, a point value is added to the current value of Relevance_Weight. For example, when positive feedback is provided, 5 points may be added to the current value of Relevance Weight.

If no entry exists in Group_Content_Rating table having an Attribute_ID matching an attribute of the user providing feedback and a Content_ID of the content item for which feedback was received, a new entry is created in Group_Content Rating when the feedback is received. The new entry has a Content_ID matching the identifier of the content item for which feedback was received and an Attribute_ID matching the identifier of an attribute of the user providing feedback. When a new entry is created, the new entry may have a Relevance_Weight value that is a default value. Alternatively, the new entry may have a Relevance_Weight value that is the sum of a default value and the point value modification resulting from the user feedback.

If additional attribute entries were located for user 12345678 in the User_Attribute_Group table, the Relevance_Weight value is adjusted for the additional attributes. The process of creating new records (where necessary) and modifying the Relevance_Weight value is continued until the relevance weight has been adjusted for each attribute group associated with the user.

In some embodiments, the method proceeds to optional block 1112, at which the adjusted relevance weight value is logged. For example, an entry in a database table such as Content_Rating_Time may be made.

If no positive feedback is received for a content item, the method proceeds to decision diamond 1108, at which it is determined whether negative feedback has been received for the content item. If negative feedback has been received, the method proceeds to block 1110. At block 1110, for each attribute group associated with the user who provided the negative feedback, a point value x is subtracted from the value of the Relevance_Weight field of the Group_Content_Rating entry having a Content_ID value matching the content item identifier and an Attribute_ID value matching the attribute identifier. In some embodiments, the point value subtracted from the relevance weight value as described at step 1110 is different from the point value added to the relevance weight value as described at step 1106.

If no entry in the Group_Content_Rating table exists for the Content_ID and Attribute_ID, a new entry is created as described above. The method then proceeds to optional step 1112 at which the relevance weight value is logged.

Figure 12:
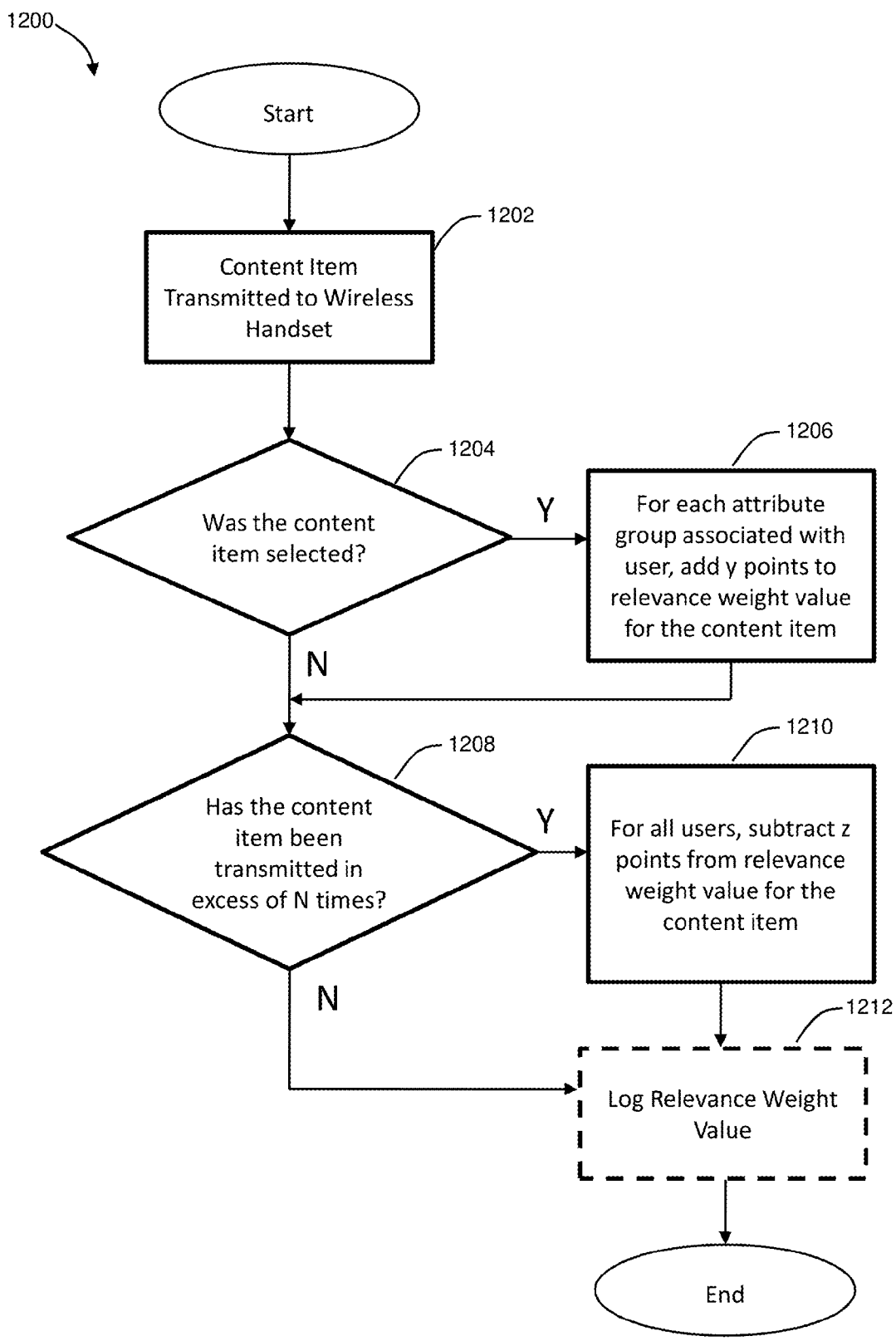
FIG. 12 shows an illustrative flow chart indicating a method for adjusting relevance weighting according to a second embodiment.

Referring now to FIG. 12, an illustrative flow chart indicating a method for adjusting relevance weighting according to a second embodiment is shown. The method begins at block 1202, at which a content item is transmitted to the wireless handset 102. The content item may be one of a plurality of content items displayed on the handset. At decision diamond 1204, relevance weight adjustment module 114 determines whether the content item was selected. A user may select a content item by, for example, clicking a content item button such as content item button 206. If the content item is selected, the method proceeds to block 1206. At block 1206, for each attribute group associated with the user who provided the positive feedback, a point value y is added to the value of the Relevance_Weight field of the Group_Content_Rating entry having a Content_ID value matching the content item identifier and an Attribute_ID value matching the attribute identifier. Point value y may be any point value, for example, 2 points. If no entry in the Group_Content_Rating table exists for the Content_ID and Attribute_ID, a new entry is created as described above The method proceeds to block 1208, at which the relevance weight adjustment module determines whether a content item has been transmitted by content delivery module 110 in excess of N times. N may be a number of times a content item is delivered from remote server 106 to wireless handset 102 or the number of times a content item is delivered to all wireless handsets capable of receiving the content item. For example, N may be 10 serves. If the content item has been transmitted in excess of N times, z points are subtracted from the value of the Relevance_Weight field of the Group_Content_Rating entry having a Content_ID value matching the content item for all users. Point value z may be any point value, for example, 5 points.

To adjust the Relevance_Weight field for all users, an attribute group having a predetermined Attribute_ID, for example, Attribute_ID 00000000, may be associated with every contact ID. For example, each time a new User_ID is created, User_Attribute_Group may receive an entry associating the new User_ID with Attribute_ID 00000000. The Relevance_Weight value may be adjusted for the Group_Content_Rating entry having a Content_ID value matching the delivered content item and Attribute_ID 00000000. In this manner, the relevance weight is adjusted for all users when a content item has been transmitted in excess of N times.

In some embodiments, the method then proceeds to optional step 1212 at which the relevance weight value is logged.

Figure 13:
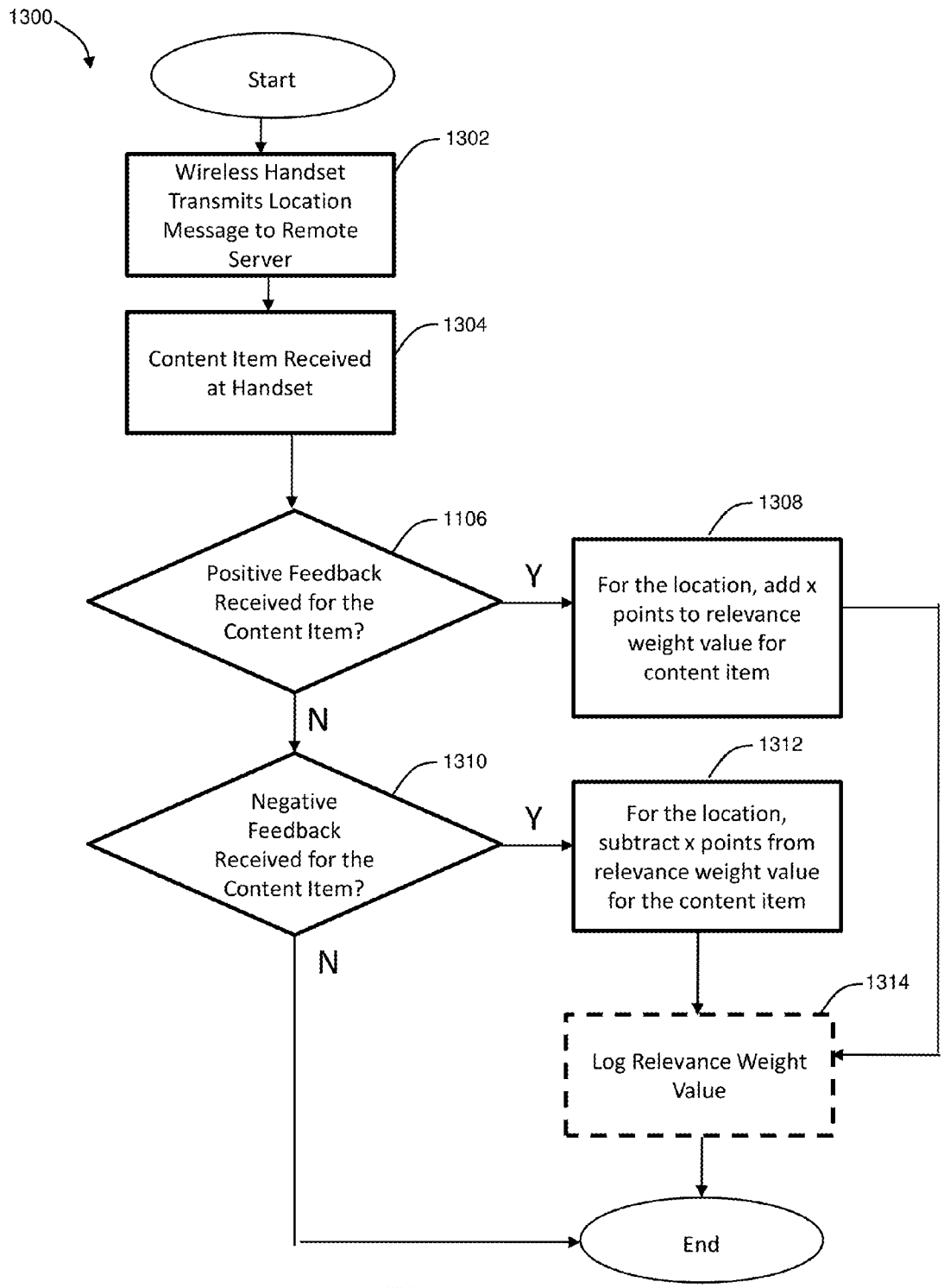
FIG. 13 shows an illustrative flow chart indicating a method for adjusting relevance weighting according to a third embodiment.

Referring now to FIG. 13, an illustrative flow chart indicating a method for adjusting relevance weighting according to a third embodiment is shown. The method begins at block 1302, at which a wireless handset transmits a location message to location detection module 108. The location message comprises information about the location of the wireless handset. The location is identified by unique identifier Location_ID. At block 1304, a content item is received at the wireless handset 102. In some embodiments, the content item received is related to the location information transmitted in the location message. For example, the content item Content_ID is associated with a Location_ID in an entry in a database table such as the Location_Content_Rating table indicated at FIG. 7. The content item may be one of a plurality of content items displayed on the handset.

At decision diamond 1306, relevance weight adjustment module 114 determines whether positive feedback has been received from the wireless handset. If positive feedback has been received for a content item, the method proceeds to block 1308. At block 1308, a point value x is added to the value of the Relevance_Weight field of the Location_Content_Rating entry having a Content_ID value matching the content item identifier and an Location_ID value matching the location identifier. Point value x may be any point value, for example, 5 points.

If no entry exists in Location_Content_Rating table having an Attribute_ID matching an attribute of the user providing feedback and a Content_ID of the content item for which feedback was received, a new entry is created in Location_Content_Rating when the feedback is received. The new entry has a Content_ID matching the identifier of the content item for which feedback was received and a Location_ID matching the identifier of an attribute of the user providing feedback. When a new entry is created, the new entry may have a Relevance_Weight value that is a default value. Alternatively, the new entry may have a Relevance_Weight value that is the sum of a default value and the point value modification resulting from the user feedback.

In some embodiments, the method proceeds to optional block 1314, at which the adjusted relevance weight value is logged. For example, an entry in a database table such as Content_Rating_Time may be made.

If no positive feedback is received for a content item, the method proceeds to decision diamond 1310, at which it is determined whether negative feedback has been received for the content item. If negative feedback has been received, the method proceeds to block 1312. At block 1312, for the Location_ID matching the location identifier, a point value x is subtracted from the value of the Relevance_Weight field of the Location_Content_Rating entry having a Content_ID value matching the content item identifier and Location_ID value matching the location identifier. In some embodiments, the point value subtracted from the relevance weight value as described at step 1312 is different from the point value added to the relevance weight value as described at step 1306.

If no entry in the Location_Content_Rating table exists for the Content_ID and Attribute_ID, a new entry is created as described above. The method then proceeds to optional step 1314 at which the relevance weight value is logged.

Figure 14:
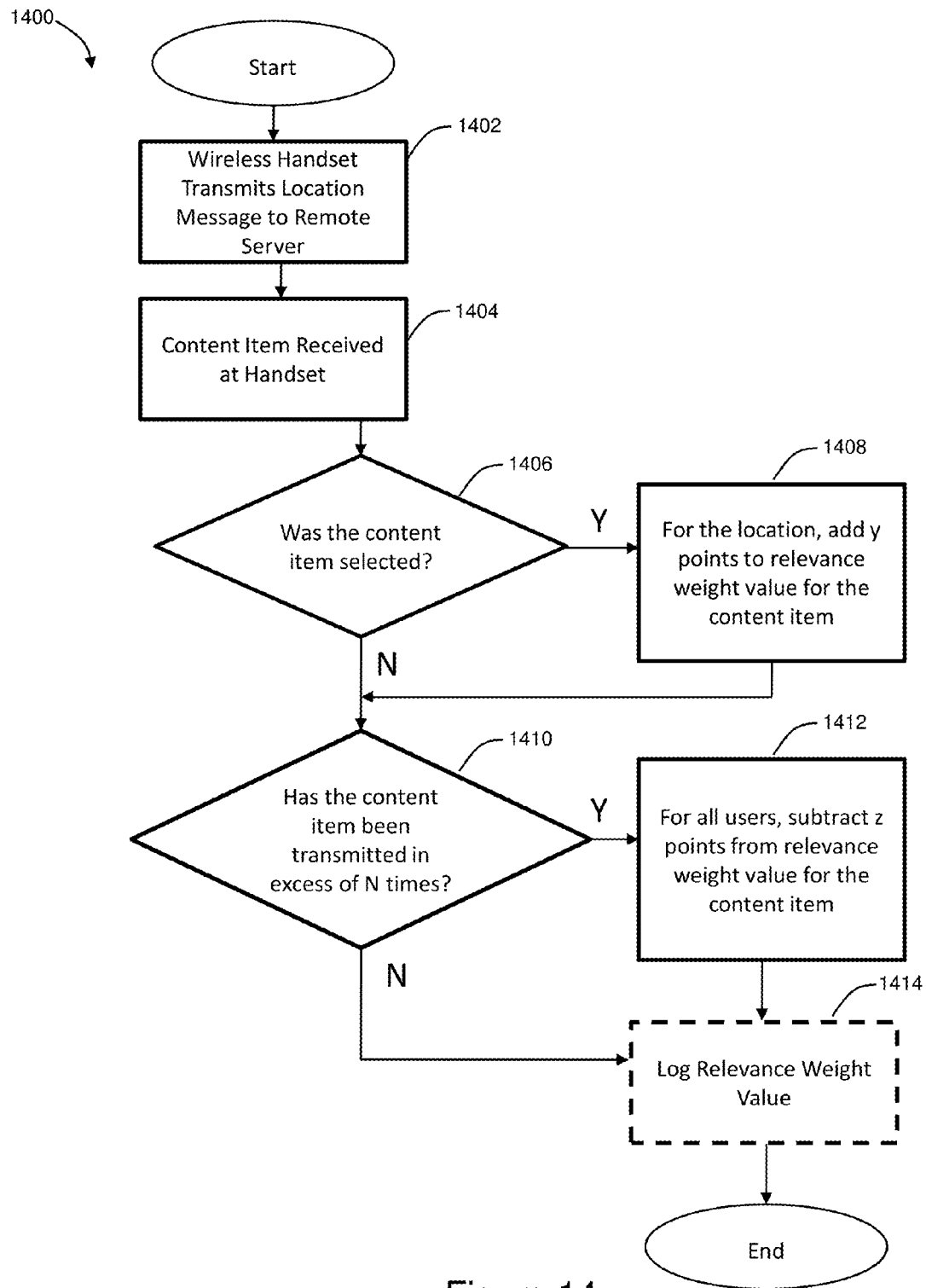
FIG. 14 shows an illustrative flow chart indicating a method for adjusting relevance weighting according to a fourth embodiment.

Referring now to FIG. 14, an illustrative flow chart indicating a method for adjusting relevance weighting according to a fourth embodiment is shown. The method begins at block 1402, at which a wireless handset transmits a location message to remote server 106. The location message comprises information about the location of the wireless handset. The location is identified by unique identifier Location_ID. At block 1404, a content item is received at the wireless handset 102. In some embodiments, the content item received is related to the location information transmitted in the location message. For example, the content item Content_ID is associated with a Location_ID in an entry in a database table such as the Location_Content_Rating table indicated at FIG. 7. The content item may be one of a plurality of content items displayed on the handset.

At decision diamond 1406, relevance weight adjustment module 114 determines whether the content item was selected. A user may select a content item by, for example, clicking a content item button such as content item button 206. If the content item is selected, the method proceeds to block 1408. At block 1408, for the Location_ID of the location reported by the wireless handset, a point value y is added to the value of the Relevance_Weight field of the Location_Content_Rating entry having a Content_ID value matching the content item identifier and an Attribute_ID value matching the attribute identifier. Point value y may be any point value, for example, 2 points. If no entry in the Location_Content_Rating table exists for the Content_ID and Attribute_ID, a new entry is created as described above The method proceeds to block 1410, at which the relevance weight adjustment module determines whether a content item has been transmitted by content delivery module 110 in excess of N times. N may be a number of times a content item is delivered from remote server 106 to wireless handset 102 or the number of times a content item is delivered to all wireless handsets capable of receiving the content item. For example, N may be 10 serves during which the content item is delivered. If the content item has been transmitted in excess of N times, z points are subtracted from the value of the Relevance_Weight field of the Location_Content_Rating entry having a Content_ID value matching the content item for all users. Point value z may be any point value, for example, 5 points.

To adjust the Relevance_Weight field for all users, a location having a predetermined Location_ID, for example, Location_ID 00000000, may be associated with every contact ID. For example, each time a new User_ID is created, User_Attribute_Group may receive an entry associating the new User_ID with Location_ID 00000000. The Relevance_Weight value may be adjusted for the Location_Content_Rating entry having a Content_ID value matching the delivered content item and Location_ID 00000000. In this manner, the relevance weight is adjusted for all users when a content item has been transmitted in excess of N times.

In some embodiments, the method then proceeds to optional step 1414 at which the relevance weight value is logged.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A content relevance weighting system for adjusting a ranking of a plurality of content items delivered to a user interface corresponding to a wireless device, the content relevance weighting system comprising:
    a content storage module communicatively coupled to a network, the content storage module storing the plurality of content items, the content storage module storing an association between a content item and a location for at least one content item associated with the plurality of content items, the content storage module storing a relevance value for each association stored in the content storage module;
    a location detection module communicatively coupled to the network, the location detection module determining when the wireless device is within a geofence;
    a content delivery module coupled to the network, the content delivery module delivering the plurality of content items to the user interface, in which a first plurality of content items correspond to a first geofence;
    a relevance weight adjustment module communicatively coupled to the network, the relevance weight adjustment module receiving a feedback input for a particular content item associated with the first plurality of content items delivered to the wireless device;
    wherein the feedback input, associated with the first plurality of content items and the first geofence, updates the relevance value associated with the particular content item; and
    wherein the ranking of the particular content item associated with the first geofence is affected by the updated relevance value.

2. The system of claim 1, wherein the relevance weight adjustment module increases the relevance value for the association between the particular content item and the first geofence when the feedback input is a positive feedback input.

3. The system of claim 1, wherein the relevance weight adjustment module decreases the relevance value for the association between the particular content item and the first geofence when the feedback input is a negative feedback input.

4. The system of claim 1, wherein the relevance weight adjustment module increases the relevance value for the association between the particular content item and the first geofence when the particular content item is selected on the wireless device.

5. The system of claim 1, wherein the relevance weight adjustment module decreases the relevance value for the association between the particular content item and the first geofence when the content delivery module has delivered the particular content item over a threshold number of deliveries.

6. The system of claim 1, wherein the location detection module receives a signal strength and a signal identifier from a beacon detected by the wireless device.

7. The system of claim 1, wherein the location detection module receives an image from the wireless device, the location detection module determining the location of the wireless device based on an analysis of the image.

8. A content relevance weighting system for adjusting a ranking of a plurality of content items delivered to a user interface corresponding to a wireless device, comprising:
- a content storage module communicatively coupled to a network, the content storage module storing the plurality of content items, the content storage module storing an association between a content item and a location for at least one content item associated with the plurality of content items, the content storage module storing a relevance value for each association stored in the content storage module;
- a location detection module communicatively coupled to the network, the location detection module determining whether a wireless device is within a geofence;
- a content delivery module coupled to the network, the content delivery module delivering the plurality of content items to the user interface, in which a first plurality of content items corresponds to a first geofence and a second plurality of content items corresponds to a second geofence;
- a relevance weight adjustment module communicatively coupled to the network, the relevance weight adjustment module receiving a first feedback input for a first particular content item associated with the first plurality of content items delivered to the wireless device, when the wireless device is located in the first geofence;
- wherein the first feedback input updates a first relevance value associated with the first particular content item and the ranking of the first particular content item is affected by the updated first relevance value;
- wherein the relevance weight adjustment module receives a second feedback input for a second particular content item associated with the second plurality of-content items delivered to the wireless device, when the wireless device is located in the second geofence; and
- wherein the second feedback input updates a second relevance value associated with the second particular content item and the ranking of the second particular content item is affected by the updated second relevance value.

9. The system of claim 8, wherein the relevance weight adjustment module increases the first relevance value for the association between the first particular content item and the first geofence when the first feedback input is a positive feedback input.

10. The system of claim 8, wherein the relevance weight adjustment module decreases the first relevance value for the association between the first particular content item and the first geofence when the first feedback input is a negative feedback input.

11. The system of claim 8, wherein the relevance weight adjustment module increases the first relevance value for the association between the first particular content item and the first geofence when the first particular content item is selected on the wireless device.

12. The system of claim 8, wherein the relevance weight adjustment module decreases the first relevance value for the association between the first particular content item and the first geofence when the content delivery module has delivered the first particular content item over a threshold number of deliveries.

13. The system of claim 8, wherein the location detection module receives a signal strength and a signal identifier from a beacon detected by the wireless device.

14. The system of claim 8, wherein the location detection module receives an image from the wireless device, the location detection module determining the location of the wireless device based on an analysis of the image.

15. A content relevance weight method for adjusting a ranking of a plurality of content items delivered to a user interface corresponding to a wireless device, the content relevance weight method comprising:
- storing the plurality of content items on a content storage module that is communicatively coupled to a network;
- storing an association between a content item and a location for at least one content item associated with the plurality of content items, the association stored in the content storage module;
- storing a relevance value for each association stored in the content storage module;
- determining with a location detection module when a wireless device is within a geofence;
- delivering with a content delivery module the plurality of content items to the wireless device, in which a first plurality of content items correspond to a first geofence, the content delivery module coupled to the network;
- receiving a feedback input for a particular content item associated with the first plurality of content items delivered to the wireless device, wherein a relevance weight adjustment module receives the feedback input from the wireless device, the relevance weight adjustment module coupled to the network;
- updating the relevance value for the particular content item with the feedback input; and
- affecting the ranking of the particular content item associated with the first geofence with the updated relevance value.

16. The method of claim 15, wherein the relevance weight adjustment module increases the relevance value for the association between the particular content item and the first geofence when the particular content item is selected on the wireless device.

17. The method of claim 15, wherein the relevance weight adjustment module decreases the relevance value for the association between the particular content item and the first geofence when the content delivery module has delivered the particular content item over a threshold number of deliveries.

18. The method of claim 15, wherein the location detection module receives a signal strength and a signal identifier from a beacon detected by the wireless device.

19. The method of claim 15, further comprising receiving with the location detection module an image from the wireless device, the location detection module determining the location of the wireless device based on an analysis of the image.

20. The method of claim 19, wherein the relevance weight adjustment module increases the relevance value for the association between the particular content item and the first geofence when the feedback input is a positive feedback input.

21. The method of claim 19, wherein the relevance weight adjustment module decreases the relevance value for the association between the particular content item and the first geofence when the feedback input is a negative feedback input.

* * * * *